US007941251B2

(12) United States Patent
Krogh et al.

(10) Patent No.: US 7,941,251 B2
(45) Date of Patent: May 10, 2011

(54) CONSISTENT LOCALIZER CAPTURES

(75) Inventors: Steven B. Krogh, Issaquah, WA (US); Andrew R. Hooker, Seattle, WA (US)

(73) Assignee: The Boeing Company, Chicago, IL (US)

( * ) Notice: Subject to any disclaimer, the term of this patent is extended or adjusted under 35 U.S.C. 154(b) by 873 days.

(21) Appl. No.: 11/752,038

(22) Filed: May 22, 2007

(65) Prior Publication Data

US 2010/0017053 A1 Jan. 21, 2010

(51) Int. Cl.
*G06F 19/00* (2006.01)

(52) U.S. Cl. ........................................................ 701/17

(58) Field of Classification Search .......... 701/3, 16–18; 340/945; 342/33–35
See application file for complete search history.

(56) References Cited

U.S. PATENT DOCUMENTS

| | | | | |
|---|---|---|---|---|
| 6,438,469 | B1 * | 8/2002 | Dwyer et al. | 701/16 |
| 6,604,044 | B1 | 8/2003 | Kirk | |
| 6,950,037 | B1 | 9/2005 | Clavier et al. | |
| 6,952,632 | B2 * | 10/2005 | Robert et al. | 701/16 |
| 7,522,977 | B2 * | 4/2009 | Foucart et al. | 701/16 |
| 2005/0004723 | A1 | 1/2005 | Duggan et al. | |
| 2005/0033489 | A1 | 2/2005 | Tezuka | |
| 2007/0129855 | A1 * | 6/2007 | Coulmeau | 701/3 |

FOREIGN PATENT DOCUMENTS

| | | | |
|---|---|---|---|
| EP | 1014104 | A2 | 6/2000 |
| FR | 2872316 | A1 | 12/2005 |
| FR | 2884022 | A1 | 10/2006 |
| WO | WO9818016 | A1 | 4/1998 |

OTHER PUBLICATIONS

Braden, et al., "Integrated Inertial Navigation System/Global Positioning System (INS/GPS) for Manned Return Vehicle Autoland Application", IEEE Plans '90, Mar. 1990, pp. 74-82.

PCT International Search Report and Written Opinion for Application No. PCT/US2008/062267, Mailed on Nov. 9, 2010, 13 pgs.

* cited by examiner

*Primary Examiner* — Yonel Beaulieu
(74) *Attorney, Agent, or Firm* — Lee & Hayes, PLLC

(57) ABSTRACT

Systems and methods for performing localizer capture maneuvers are disclosed. In one embodiment, a method includes determining at least one instrument landing system (ILS) threshold of an aircraft, and establishing at least one final approach course (FAC) deviation threshold for the aircraft. The method further includes receiving at least one ILS localizer error, then calculating at least one FAC deviation. The at least one ILS localizer error is compared to the ILS threshold, and the at least one FAC deviation is compared to the FAC threshold. A standard capture maneuver is performed if the at least one ILS localizer error reaches its corresponding ILS threshold prior to the at least one FAC deviation reaching its FAC threshold. However, if the at least one FAC deviation reaches its corresponding FAC threshold prior to the at least one ILS localizer error reaching its corresponding ILS threshold, a modified capture maneuver is performed.

20 Claims, 4 Drawing Sheets

CONSISTENT LOCALIZER CAPTURES

CROSS REFERENCE TO RELATED APPLICATIONS

This application is related to U.S. patent application Ser. No. 11/848,127, entitled "Aircraft Guidance Using Localizer Capture Criteria for Rectilinear Displacement Data," filed on Aug. 30, 2007, which is a continuation-in-part of this application.

FIELD OF THE INVENTION

This invention relates to systems and methods for runway approach guidance of aircraft, and more specifically, to systems and methods for performing Instrument Landing System (ILS) localizer capture maneuvers.

BACKGROUND OF THE INVENTION

Generally speaking, Instrument Landing Systems (ILS) are widely used in the aviation industry to provide guidance to aircraft. Specifically, ILS are often used to provide approach guidance to an aircraft for landing. The system usually consists of transmitters and antenna arrays on the ground, antennas and receivers on the aircraft, and a display for the flight crew. Autopilots and flight directors may also actively participate in the system.

The component of the ILS that provides lateral guidance beams is commonly referred to as the localizer. Vertical guidance beams may be provided by the glide slope component of the ILS system. Both components provide the aircraft with an indication of its separation from the desired approach path, in the form of angular error.

An aircraft preparing to perform a landing approach may fly a flight path which intersects the localizer. Typically, when an aircraft reaches the linear part of the localizer beam, (the course guidance sector), it executes a localizer capture maneuver to capture the desired approach path (the null of the localizer). In most instances, the localizer null may be configured to align with a runway centerline. Alternatively, the localizer null may be configured to indicate a particular point in space from which a flight crew may maneuver the aircraft to a corresponding runway.

Accordingly, after a successful capture maneuver, the aircraft's flight path will generally be in line with the runway centerline or aligned with the particular point in space. Ideally, the aircraft on approach performs a single turn to capture the localizer null, and will not fly through the null (overshoot) prior to completing its turn.

Although desirable results have been achieved using such prior art systems, there may be room for improvement. For example, localizer overshoots may occur due to the fact that the segment of the localizer beam which reliably provides an accurate indication of aircraft displacement is relatively narrow. This segment, commonly known as the course guidance sector, may be only approximately +/−2 degrees of arc about the localizer null. As a result, if an aircraft does not begin its capture maneuver until it encounters this sector, it typically only has a small distance in which to complete its turn in order to avoid an overshoot.

Additionally, an overshoot may be exacerbated if the aircraft is intercepting the localizer with a large intercept angle, a high ground speed, or is close to the airfield (where the angular beam width corresponds to a smaller physical distance). Localizer captures with a significant overshoot may waste fuel, may cause discomfort for aircraft passengers, and may make it necessary for air traffic control to widely space incoming aircraft at airfields with parallel runways. Therefore, novel systems and methods which reduce or eliminate overshoots during localizer capture maneuvers would have utility.

SUMMARY OF THE INVENTION

The present disclosure is directed to systems and methods for providing consistent localizer captures. More specifically, embodiments of systems and methods in accordance with the present disclosure may advantageously reduce or eliminate overshoots during localizer capture maneuvers by allowing an aircraft to begin capture maneuvers prior to reaching the course guidance sector. Such embodiments may also advantageously enable the performance of localizer capture maneuvers at larger intercept angles. In this way, airlines may realize fuel and time savings as localizer overshoots are reduced. Moreover, congestion at airports may be relieved as reductions in the overshoots may allow aircraft to be sequenced more closely together during landing approaches.

In one embodiment, a method for guiding an aircraft includes determining at least one instrument landing system (ILS) threshold of an aircraft from a computer-readable database, and establishing at least one final approach course (FAC) deviation threshold for the aircraft. The method further includes receiving at least one ILS localizer error, then calculating at least one FAC deviation. The at least one ILS localizer error is compared to the ILS threshold, and the at least one FAC deviation is compared to the FAC threshold. In an additional embodiment, a standard capture maneuver is performed if the at least one ILS localizer error reaches its corresponding threshold prior to the at least one FAC deviation reaching its threshold. However, if the at least one FAC deviation reaches its corresponding threshold prior to the at least one ILS localizer error reaching its corresponding threshold, a modified capture maneuver is performed. In particular embodiments, the standard capture maneuver is performed upon nearing a course guidance sector, and the modified capture maneuver is performed prior to reaching the course guidance sector.

In another embodiment, a computer readable medium includes computer-executables that can be executed to perform a method. The method includes determining at least one instrument landing system (ILS) threshold of an aircraft, and establishing at least one final approach course (FAC) deviation threshold for the aircraft. The method further includes receiving at least one instrument landing system (ILS) input for the aircraft, then receiving at least one FAC deviation input for the aircraft. The at least one ILS localizer error is compared with the corresponding ILS threshold, and the at least one FAC deviation is compared with the corresponding FAC threshold. The method then performs a standard ILS capture maneuver if the at least one ILS localizer error reaches its corresponding ILS threshold. However, the method will also, prior to performing the standard ILS capture maneuver, perform a shallow angle turn maneuver if the at least one FAC deviation reaches its corresponding FAC threshold.

In an additional embodiment, an aircraft is disclosed. The aircraft includes a structural assembly, and at least one system for guiding aircraft at least partially disposed within the structural assembly. The guidance system includes an instrument landing system (ILS) data component configured to receive at least one ILS localizer error and at least one calculated ILS threshold, and a flight management function (FMF) data component configured to receive at least one calculated final approach course (FAC) deviation and at least one established FAC deviation threshold. The guidance system further includes a comparator component configured to compare the at least one ILS localizer error and the at least one FAC deviation with corresponding ILS and FAC thresholds.

Finally, the guidance system also includes an execution component configured to perform a standard capture maneuver if the at least one ILS localizer error reaches its corresponding ILS threshold prior to the at least one FAC deviation reaching its corresponding FAC threshold, and perform a modified capture maneuver if the at least one FAC deviation reaches its corresponding FAC threshold prior to the at least one ILS localizer error reaching its corresponding ILS threshold.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

BRIEF DESCRIPTION OF THE DRAWINGS

Embodiments of systems and methods in accordance with the teachings of the present disclosure are described in detail below with reference to the following drawings.

DETAILED DESCRIPTION

Embodiments of systems and methods in accordance with the present disclosure are directed to aircraft performance localizer capture maneuvers. Many specific details of certain embodiments of the invention are set forth in the following description and in FIGS. 1-4 to provide a thorough understanding of such embodiments. The present invention may have additional embodiments, or may be practiced without one or more of the details described below.

Generally, embodiments of systems and methods in accordance with the present disclosure advantageously reduce or eliminate overshoots during localizer capture maneuvers. Such embodiments may also advantageously enable the performance of localizer capture maneuvers at larger intercept angles, which may result in fuel and time savings, as well as relieve air traffic congestion at airports.

Figure 1:
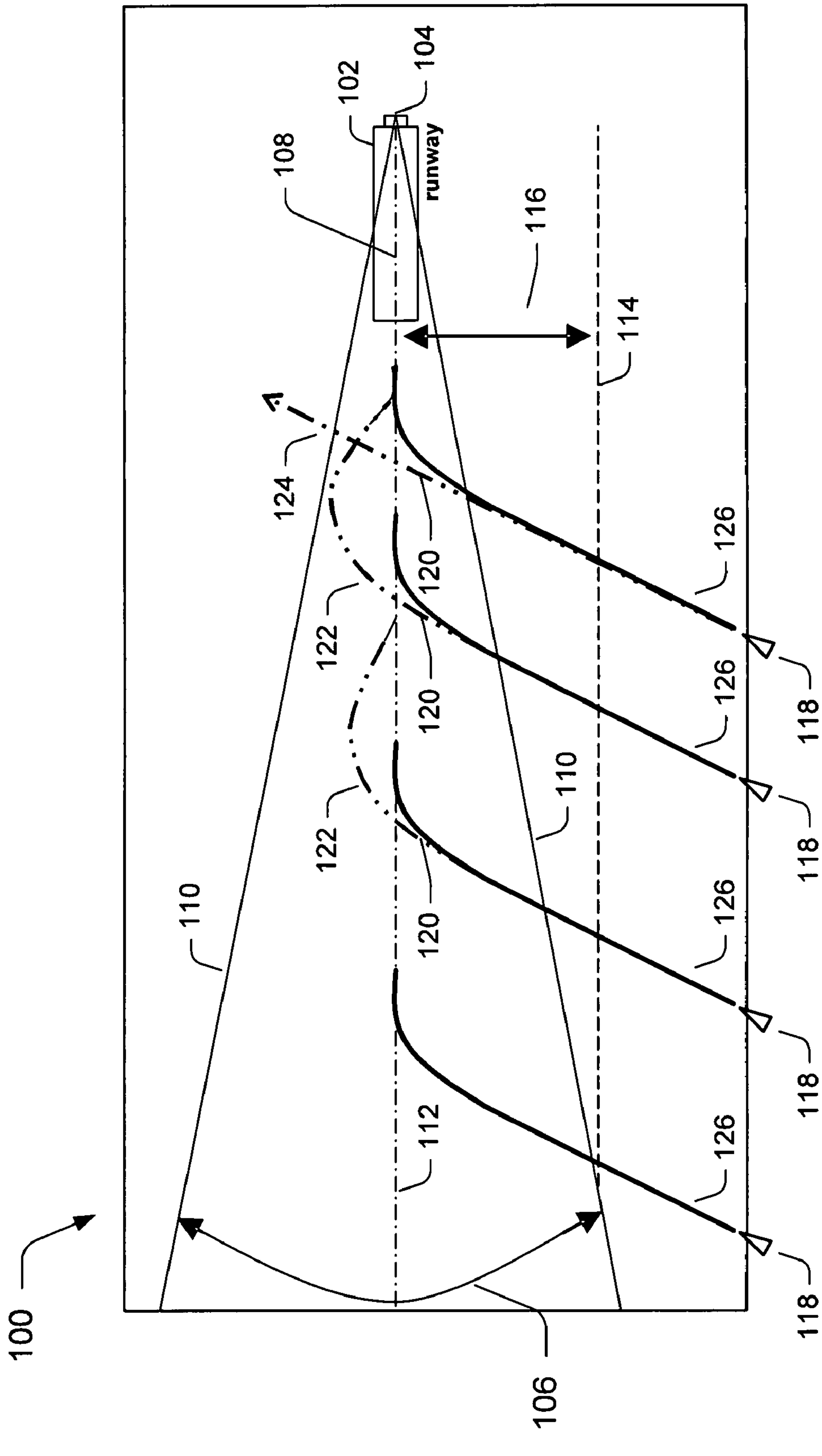
FIG. 1 is an aerial view depicting an exemplary concept for performing capture maneuvers, including standard and modified track-to-localizer capture maneuvers, in accordance with an embodiment of the invention.

FIG. 1 is an aerial view depicting an exemplary concept 100 for performing consistent capture maneuvers, including standard and modified track-to-localizer capture maneuvers, in accordance with an embodiment of the invention. FIG. 1 illustrates a runway 102 equipped with an instrument landing system (ILS) that includes a localizer 104. In one embodiment, the localizer 104 may include a plurality of transmitters and antenna arrays (not shown). The localizer 104 includes an ILS course guidance sector 106. The guidance sector 106 also includes a localizer null 108. Physical offset from the null, which describes the horizontal operational perimeters of the ILS, may be depicted by ILS boundaries 110. Typically, the ILS course guidance sector 106 may be visualized as an area defined by an arc emanating from the localizer 104 and enclosed by the ILS boundaries 110.

FIG. 1 also illustrates a final approach course (FAC) 112. Generally speaking, a final approach course is a flight path that enables an aircraft to approach and land on a runway. As shown, the final approach course 112 is flanked by an FAC deviation threshold 114. The FAC deviation threshold 114 represents a predetermined distance 116 from the final approach course. Although only one FAC deviation threshold 114 is shown in FIG. 1, it will be appreciated that in alternative embodiments, FAC deviation thresholds 114 may be present along both longitudinal sides of final approach course 112. As shown in FIG. 1, the FAC deviation thresholds 114 may be placed farther away from runway 102 than the ILS boundaries 110 at least along some portions of their length.

In most instances, standard localizer capture maneuvers 120 may be initiated when an aircraft 118 approximates the course guidance sector 106. In other words, standard localizer capture maneuvers 120 may be initiated when an aircraft is in close proximity to or reaches the course guidance sector 106. In most instances, a standard localizer capture maneuver 120 is initiated when an aircraft 118 reaches the course guidance section because the aircraft generally has to rely on ILS signals present in the course guidance sector 106. However, in some instances, the aircraft 118 may compare inertia data with ILS signals outside the course guidance sector 106. This comparison may enable aircraft 118 to begin a standard localizer capture maneuver 120 in proximity of but prior to reaching the course guidance sector 106.

Regardless of the particular instance, the aircraft 118 typically uses the ILS signals to determine what are known as ILS localizer errors, that is, angular deviations from the localizer null 108. Additionally, ILS localizer errors may also include estimated rectilinear deviations calculated from the angular deviations.

The aircraft 118 may initiate a turn if these ILS localizer errors satisfy certain predetermined criteria. Moreover, the ILS localizer errors also generally serve as feedback terms during the capture maneuver, guiding the aircraft in making the necessary turn to line up with a runway, such as runway 102, or any desired point in space from which final landing may be performed. In some instances, ground track angle, ground speed and runway heading may also be used to determine when the aircraft 118 may initiate a standard localizer capture maneuver 120.

However, as described above, the initialization of standard localizer capture maneuvers 120 in the course guidance section 106 may result in overshoots 122, or failures to capture 124. In contrast, modified capture maneuvers 126, in accordance to various embodiments describe herein, turn the aircraft 118 into a shallow intercept angle prior to reaching the course guidance vector 106, thus facilitating any additional turns by the aircraft 118 in the course guidance sector 106. As a result, the performance of these modified capture maneuvers may advantageously reduce or eliminate overshoots and failures to capture that are associated with the standard localizer capture maneuvers.

Figure 2:
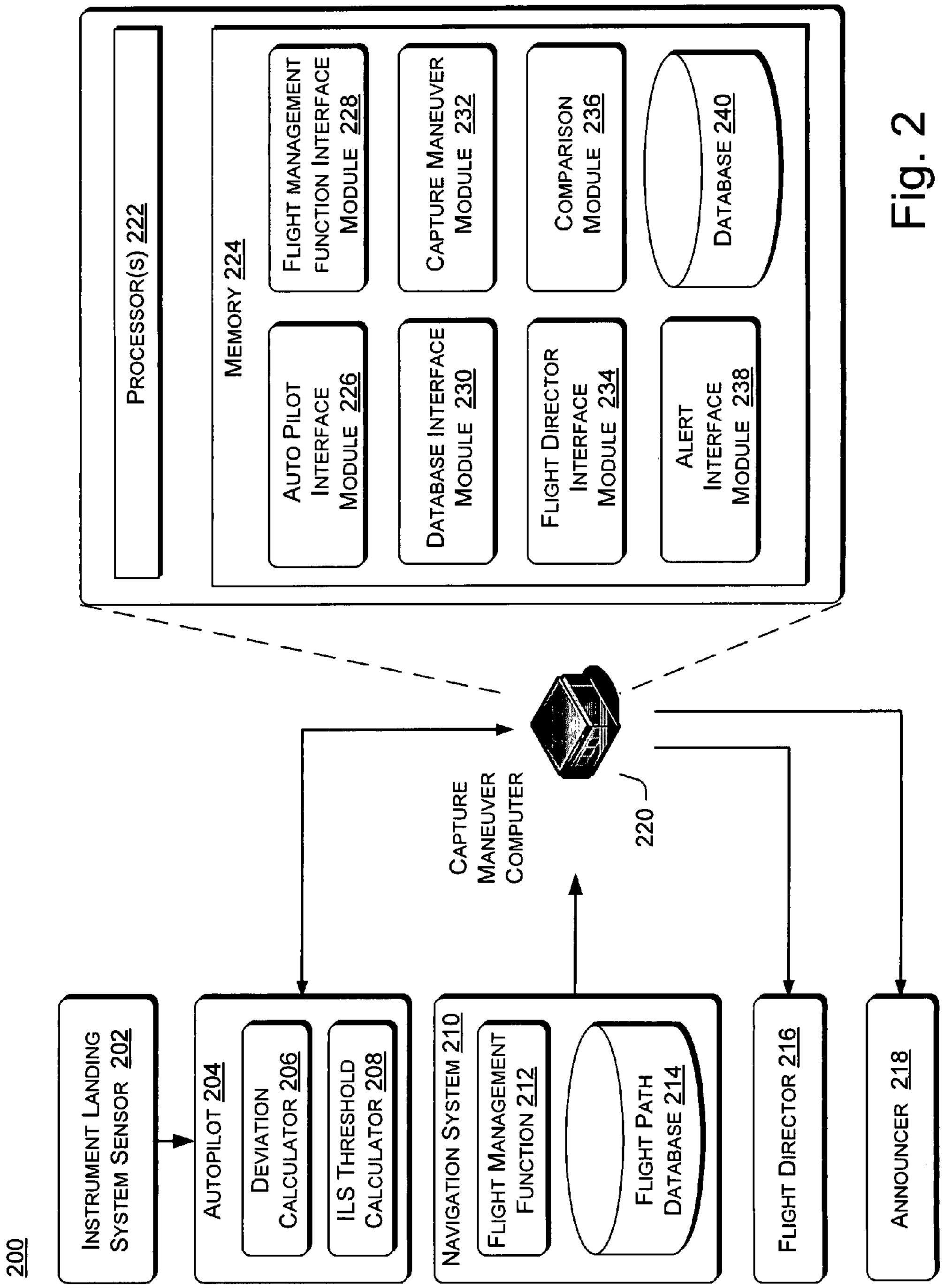
FIG. 2 is a block diagram depicting an exemplary avionics system in which methods for performing localizer capture maneuvers, as shown in FIG. 1, may be implemented.

FIG. 2 is a block diagram depicting an exemplary avionic system 200 of an aircraft in which methods for performing localizer capture maneuvers may be implemented. The system 200 includes an instrument landing system (ILS) sensor 202, an autopilot 204 that includes a deviation calculator 206 and an ILS threshold calculator 208, a navigation system 210 that includes a flight management function 212 and an approach database 214, a flight director 216, an announcer 218, and an exemplary capture maneuver computer 220. In one embodiment, methods for performing localizer capture maneuvers in accordance with the teachings of the present disclosure may be implemented in the exemplary capture maneuver computer 220.

With continued reference to FIG. 2, the ILS sensor 202 may be configured to receive guidance signals from ground components, e.g., transmitters and antenna arrays, of an ILS via appropriate receivers. For each landing approach, the ILS sensor 202 may process these signals and acquire one or more angular separations of the aircraft from the localizer null 108 (FIG. 1) of the ILS.

The autopilot 204 is generally configured to pilot the aircraft without human intervention. In some embodiments, the autopilot 204 may be configured to receive the angular deviations during each landing approach. The autopilot 204 may use the deviation calculator 206 to convert the angular deviations to estimated rectilinear deviations through the use of radio altitude, glide slope error, and estimated distances to the transmitters of the ILS.

The autopilot 204 may be further configured to employ the ILS threshold calculator 208 to calculate one or more ILS thresholds. In one implementation, the one or more ILS thresholds may be calculated based on factors such as aircraft ground speed and intercept angle. However, it will be appreciated that in other implementations, additional factors may be used to calculate the ILS thresholds.

As described above, during aircraft landings using the ILS, either the angular deviation, or the estimated rectilinear deviations, collectively known as localizer errors, may be compared to predetermined ILS deviation criteria, e.g., the calculated ILS thresholds. It will be further appreciated that the deviation calculator 206 and the ILS threshold calculator 208 may be implemented as software algorithms or computer-executable instructions in the autopilot 204. However, in other instances, the deviation calculator 206 and the ILS threshold calculator 208 may also be implemented in one or more other avionic components that are capable of receiving, processing, and storing data The navigation system 210 may be used to provide the geographical position of the aircraft during flight. The navigation system 210 may include an Inertial Reference System (IRS), an Attitude Heading and Reference System (AHRS), a Global Positioning System (GPS), and the like. In various embodiments, the navigation system 210 may also include an onboard flight path database 214 that describes the final approach courses to one or more destinations, e.g., airport runways. Accordingly, the navigation system 210 may use the data contained in database 214 to guide the aircraft along a particular route to a destination runway. Moreover, the navigation system 210 may be further equipped with a flight management function (FMF) 212 that calculates FAC deviations from selected final approach courses. A FAC deviation is the shortest linear distance from an airborne aircraft to a final approach course.

The flight director 216 is generally configured to compute and display the proper path for the aircraft to one or more pilots during a specific flight. The flight director 216 may include a flight director indicator (FDI), a horizontal situation indicator (HSI), a mode selector, and a flight director computer. Moreover, the FDI may include a display that may present an attitude indicator, a fixed aircraft symbol, pitch and bank command bars, a glide slope indicator, a localizer deviation indicator, and the like. The flight director 216 may furnish a pilot with steering commands necessary to obtain and hold a desired path. As described below, the flight director 216 may be configured to provide steering commands necessary to perform capture maneuvers.

Additionally, the exemplary avionics system 200 may also include an announcer 218. The announcer 218 may include a speaker, a buzzer, or other types of warning or noise-generating device. The announcer 218 may be activated by the exemplary avionics system 200 to provide audio warnings and messages to a flight crew. In one particular embodiment, the announcer 218 may be activated by the capture maneuver computer 220.

As further shown in FIG. 2, the capture maneuver computer 220 has processing capabilities and memory suitable to store and execute computer-executable instructions. In one embodiment, the capture maneuver computer 220 includes one or more processors 222 and memory 224. The memory 224 may include volatile and nonvolatile memory, removable and non-removable media implemented in any method or technology for storage of information, such as computer-readable instructions, data structures, program modules or other data. Such memory includes, but is not limited to, random access memory (RAM), read-only memory (ROM), electrically erasable programmable read-only memory (EEPROM), flash memory or other memory technology, compact disc, read-only memory (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computer system.

Modules which enable the capture maneuver computer 220 to perform various functions may be stored in the memory 224, including an autopilot interface module 226, a flight management function interface module 228, a database interface module 230, a capture maneuver module 232, a flight director interface module 234, a comparison module 236, an alert interface module 236, and a database 240. These modules may be implemented as software or computer-executable instructions that are executed by the one or more processors 222 to perform the functions described below.

The autopilot interface module 226 is configured to communicate with the autopilot 204. The communication may be established over an electrical connection, an optical connection, and the like. In some embodiments, the autopilot interface module 226 may be configured to receive one or more angular deviations, or alternatively, estimated rectilinear deviations, from the autopilot 204. As described, the estimated rectilinear deviations may be calculated from the angular deviations received by the autopilot 204. In other embodiments, the autopilot interface module 226 may also be configured to enable the autopilot 204 to perform capture maneuvers under the direction of the capture maneuver computer 220, as describe below.

The flight management function interface module 228 is configured to communicate with the flight management function 212 of the navigation system 210. The communication may be established over an electrical connection, an optical connection, and the like. In some embodiments, the flight management function interface module 228 is configured to receive the calculated final approach path deviations, that is, FAC deviations, from the flight management function 212.

The database interface module 230 enables the reading of data from and writing of data to the database 240. According to various embodiments, the database interface module 230 may be activated by the other modules in memory 224, as further described below. In some embodiments, the database 240 may contain information such as ILS criteria data (e.g., ILS thresholds) that are used to analyze the ILS localizer errors, FAC deviation criteria (e.g., FAC deviation thresholds), as well as other data that are necessary to initiate a standard capture maneuver based on ground track angle, ground speed, and runway heading. For example, the ILS criteria data may include the plus or minus feet of specified estimated rectilinear deviations, and the FAC criteria data may include plus or minus feet of specified FAC deviations.

The capture maneuver module 232 may be employed to command the autopilot 204 to automatically perform localizer capture maneuvers. Alternatively, the capture maneuver module 232 may be employed to provide information to the flight director 216. This information may enable a pilot to manually perform localizer capture maneuvers. In some embodiments, the capture maneuver module 232 may be configured to direct the performance of the standard localizer captures and the modified localizer captures.

The flight director interface module 234 may facilitate the communication between flight director 216 and the capture maneuver module 232. Accordingly, the flight director interface module 234 may enable the flight director 216 to provide a pilot with the necessary steering commands to complete one of a standard capture maneuver and a modified capture maneuver.

The comparison module 236 may determine the timing and type of the localizer capture maneuver performed by the aircraft. In one implementation, the comparison module 236 may be configured to receive the estimated rectilinear deviations from the autopilot interface module 226, as well as FAC deviations from the flight management function interface module 228. In another implementation, instead of the estimated rectilinear deviation, the comparison module may be configured to receive angular deviations from the autopilot interface module 226. Additionally, the comparison module 236 may retrieve the criteria from the criteria database 240 via the database interface module 230.

In some embodiments, the comparison module 236 may include a first algorithm that compares either the angular deviations or the estimated rectilinear deviations, i.e., ILS localizer errors with their corresponding criteria or thresholds to determine when to initiate localizer capture maneuvers. Moreover, the comparison module 236 may include a second algorithm that simultaneously compares the FAC deviations with their corresponding criteria. If the ILS localizer errors are satisfied first, the comparison module 236 may command the capture maneuver module 232 to direct the performance of a standard capture maneuver. However, if the FAC deviation criteria are met first, the comparison module 236 may command the capture maneuver module 232 to direct the performance of a modified capture maneuver.

Typically, the angular deviations or estimated rectilinear deviation criteria may be satisfied when an aircraft 118 approximates the course guidance sector 106, as described above with reference to FIG. 1. Once the aircraft 118 nears the course guidance section 106, angular deviation or estimated rectilinear deviation may be used to perform the standard localizer capture maneuver. In additional embodiments, aircraft ground track angles, ground speeds, and runway headings may also be used in conjunction with one of the angular deviations and estimated rectilinear deviations to perform the standard localizer capture maneuver. In some embodiments, the performance of the standard capture maneuver, as directed by the capture maneuver module 232, generally aligns the aircraft heading with the centerline of a runway, thereby facilitating the landing of the aircraft 118. The performance of the standard capture maneuver may be based on a standard localizer control law algorithm that is part of the capture module 232.

On the other hand, the FAC deviation criteria may be satisfied when the aircraft 118 crosses the FAC deviation thresholds 114 established along the lengths of a runway. In some embodiments, the FAC deviation thresholds may be provided at a range of at least +/−24,000 feet from the runway. In particular embodiments, the range may be established to provide commonality with deviations used for global navigation satellite system (GNSS) landing systems, as per Aeronautical Radio Incorporated (ARINC) specification 755.

In some embodiments, the comparison module 236 may command the capture maneuver module 232 to direct the performance of a modified capture maneuver that includes at least two parts. The first part of the maneuver may turn the aircraft to a shallow intercept angle. In one particular embodiment, the shallow intercept angle may include angles in the range of approximately 30 to 40 degrees. This part may be referred to as a "track-to-localizer" mode. In some embodiments, the capture maneuver module 232 may direct the performance of the "track-to-localizer" mode using an algorithm adapted from existing track selection control law algorithms implemented in other aircraft control systems. In some embodiments, "track-to-localizer" mode may, concurrent with turning the aircraft to a shallow intercept, also roll the aircraft to a predetermined bank angle. In one implementation, the bank angle may be approximately 30 degrees.

However, while the capture maneuver module 232 is directing the performance of the "track-to-localizer" mode, the comparison module 236 may continuously monitor the angular deviations or the estimated rectilinear deviations, i.e., ILS localizer errors, from the autopilot 204. Once the ILS localizer errors reach their corresponding criteria, e.g., the aircraft reaches the ILS course guidance sector 106, the comparison module 236 may command the capture maneuver module 232 to switch to the performance of at least a portion of the standard capture maneuver. This subsequent performance may complete the capture maneuver. In particular embodiments, the capture maneuver module 232 may accomplish the switch by reverting to the standard localizer capture algorithm, and using the algorithm to perform the portion of the standard localizer capture appropriate for completing the modified capture maneuver.

The modified capture maneuver may advantageously result in smaller overshoots when compared to overshoots resulting from standard capture maneuvers 122 (with reference to FIG. 1). This is because the initial shallow capture angle directed by the "track-to-localizer" mode may facilitate the subsequent performance of the remaining portion of the standard capture maneuver.

In some embodiments, the FAC deviations are subject to error if navigation solutions from the navigation system 210 are inaccurate. This may cause the comparison module 236 to command the capture maneuver module 232 to prematurely initiate, or delay the initiation of the modified capture maneuver.

Accordingly, the comparison module 236 may be configured to direct the capture maneuver module 232 to disable the "track-to-localizer" mode if there are indications that the navigation system 210 may be producing inaccurate FAC deviations. For example, some navigation systems may generate an estimate of actual navigation performance (ANP), which may be used to indicate navigation inaccuracies, and consequently, inaccurate FAC deviations.

Moreover, the use of shallow intercept angles in the "track-to-localizer" mode, particularly shallow intercept angles in the range of 30 to 40 degrees, may be advantageous because larger angles may be too steep to yield a small overshoot after the standard localizer algorithm takes over. Additionally, intercept angles in the range of approximately 30 to 40 degrees, may mitigate the risk of risk of failing to intercept the localizer at an acceptable distance from the runway, if errors in the FAC deviations cause the modified capture maneuver to begin too soon. These risks may be especially prevalent when the intercept angle is less than 30 degrees.

In other embodiments, the comparison module 236 may command capture maneuver module 232 to disable the "track-to-localizer" mode if the comparison module 236 determines that an aircraft is already at a shallow intercept angle to the runway at the time it cross the FAC deviation threshold 114. In one particular embodiment, the "track-to-localizer" mode may be disabled if the intercept angle is less than approximately 40 degrees. In additional embodiments, the "track-to-localizer" mode may be similarly disabled if the comparison module 236 determines that the aircraft is at steep intercept angle, such as an intercept angle that is greater than approximately 120 degrees.

The alert interface module 238 may be directed by the capture maneuver module 232 to cause the announcer 218 to alert a flight crew that the "track-to-localizer" mode is active. In one implementation, the announcer interface module may cause the announcer 218 to inform the crew of the initialization and the termination of the "track-to-localizer" mode. In another implementation, the announcer 218 may be activated for the duration that the "track-to-localizer" mode is active. According to various embodiments, the alert interface module 238 may activate the announcer 218 to convey information by representative tones or human speech.

In additional embodiments, the capture maneuver computer 220 may also use the alert interface module 238 to cause one or more cockpit display (not shown) to visually indicate that the "track-to-localizer" mode is active. For example, in one implementation, a primary flight display (PFD) may be activated by the capture maneuver computer 220 to present symbols or characters during the activation of the "track-to-localizer" mode. In another implementation, one or more push button lights on the mode control panel (MCP) may illuminate during the "track-to-localizer" mode activation to provide visual alert.

It should be appreciated that the illustrated avionic environment 200 is only one example of a suitable operating environment and is not intended to suggest any limitation as to the scope of use or functionality of the invention. Other avionic environments and/or configurations may be suitable for use with the invention. For example, the exemplary capture maneuver computer 220 may a part of a flight management computer (FMC). In other exemplary instances, one or more of the modules 226-238 may be directly implemented on the FMC, the autopilot 204, or any other suitable avionic component of a flight management system (FMS), navigation system, or any avionic system present in an aircraft that is capable of receiving, processing, and storing data.

Figure 3:
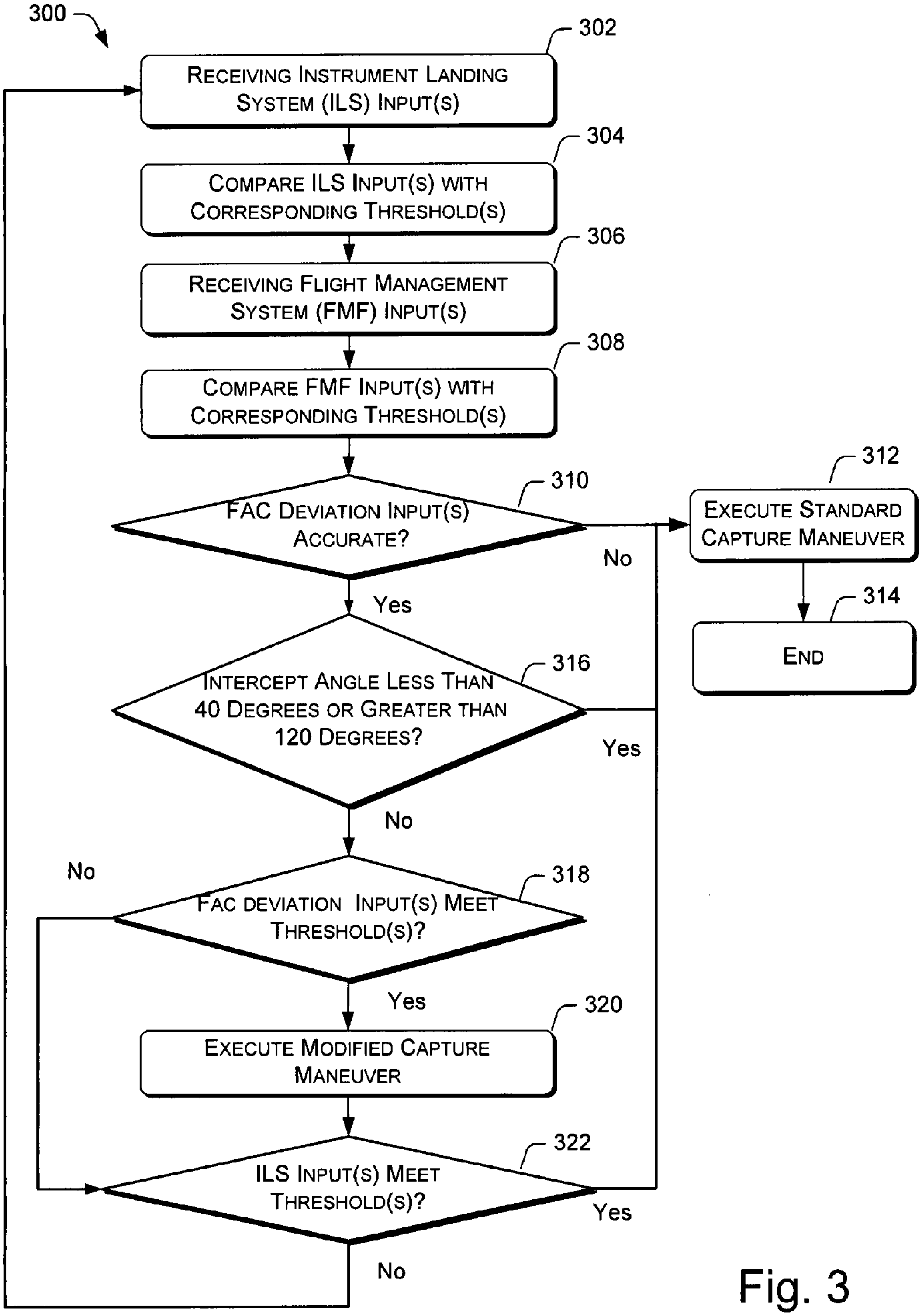
FIG. 3 is a flowing diagram illustrating an exemplary process for performing localizer captures using the system shown in FIG. 2, in accordance with an embodiment of the invention.

FIG. 3 is a flow diagram illustrating an exemplary process 300 for performing localizer captures using the system 200 shown in FIG. 2, in accordance with an embodiment of the invention. The exemplary process 300 in FIG. 3 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to avionics system 200 of FIG. 2, although they may be implemented in other system architectures.

At block 302, an aircraft is in the general vicinity of a runway. At this time, the capture maneuver computer 220 may employ the autopilot interface module 226 to receive the ILS localizer errors from the autopilot 204. The ILS localizer errors may include angular separation or estimated rectilinear deviations as calculated by the deviation calculator 206. At block 304, the comparison module 236 may compare the ILS localizer errors, such as the angular deviations, with the corresponding criteria stored in the database 240. As described above, in some embodiments, additional data used may include ground track angles, ground speed, and runway headings.

At block 306, the capture maneuver computer 220 may employ the flight management function interface module 228 to receive FAC deviations from the navigation system 210. As described above, the FAC deviations may be calculated by the FMF 212.

At block 308, the comparison module 236 may continuously compare the FAC deviations with the corresponding FAC deviation thresholds stored in the database 240. In one particular implementation, blocks 306-308 may be performed simultaneously with blocks 302-304.

At decision block 310, the comparison module 236 may make a determination as to whether the navigation data, including FAC deviations, as obtained from the navigation system 210 are accurate. In one embodiment, the comparison module 236 may make this determination based on information from an aircraft FMS that is capable of estimating actual navigation performance (ANP).

If the comparison module 236 determines that the navigation data, including FAC deviations, are not accurate, ("no" at decision block 310), the comparison module 236 may direct the capture maneuver module 232 to disable the "track-to-localizer" mode. Consequently, at block 312, the capture maneuver module 232 may guide the aircraft to perform a standard localizer capture when the ILS localizer errors reach their corresponding thresholds. Once the standard localizer capture has been successfully performed and the aircraft centers on the runway 102, the process 300 may terminate at block 314. According to various embodiments, the capture maneuver module 232 may direct the aircraft by executing the capture maneuvers directly via the autopilot 204 or providing steering guidance to a pilot via the flight director 216.

However, if the comparison module 236 determines that the navigation data, include FAC deviation, are accurate, ("yes" at decision block 310), the process may continue to block 316. At decision block 316, the comparison module 236 may determine whether the aircraft is currently at an intercept angle to the runway heading that is within a desired range. For example, in some embodiments, the desired range is less than approximately 40 degrees or greater than approximately 120 degrees with respect to the runway. In one embodiment, the comparison module 236 may make this determination as the aircraft reaches the FAC deviation threshold 114. In this embodiment, if the comparison module 236 determines that the intercept angle is less than a lower limit (e.g. approximately 40 degrees) or greater than an upper limit (e.g. approximately 120 degrees), ("yes" at decision block 316), the comparison module 236 may direct the capture maneuver module 232 to disable the "track-to-localizer" mode. Consequently, the process continues to block 312, where the capture maneuver module 232 may direct the aircraft to perform a standard localizer capture when the ILS localizer errors reach their corresponding threshold.

However, if the comparison module 236 determines that the intercept angle is between the lower limit and the upper limit, (e.g., equal to or greater than approximately 40 degrees, and equal to or less than approximately 120 degrees), ("no" at decision block 316), the comparison module may proceed to make a further determination at block 318.

At decision block 318, the comparison module 236 may determine whether the one or more FAC deviations are reaching their corresponding thresholds. If the FAC deviations reach their thresholds ("yes" at decision block 318), the comparison module 236 may direct the capture maneuver module 232 to perform the modified capture maneuver at block 320. Typically, the FAC deviations reach their corresponding thresholds prior to the ILS localizer errors reach their corresponding threshold. This is because FAC deviation thresholds 114 are generally positioned farther from the runway 102 than the ILS guidance sector boundaries 110.

However, if the FAC deviations do not reach their thresholds first ("no" at decision block 318), the process may continue to block 320. In one instance, this scenario may occur if the navigation system 210 fails to continuously provide FAC deviations.

At decision block 322, the comparison module 236 may determine whether the one or more ILS localizer errors are reaching their corresponding thresholds. In one embodiment, the comparison module 236 is carrying out this determination while a modified capture maneuver is being executed. In another embodiment, the comparison module 236 is carrying out this determination while concurrently making a determination as to whether the one or more FAC deviations are reaching their corresponding thresholds (as described in decision block 318).

Regardless of the embodiment, if the comparison module 236 determines that the one or more ILS localizer errors reach their thresholds at decision block 322 ("yes" at decision block 322), the process continues at block 312. At block 312, the comparison module 236 may command the capture maneuver module 232 to direct the aircraft to perform the standard capture maneuver. Furthermore, if the comparison module 236 has previous commanded the performance of a modified capture maneuver, the performance of the standard capture maneuver may be appropriately tailored to transit the aircraft from the performance of the "track-to-localizer" mode. Finally, once the standard localizer capture has been successfully performed and the aircraft centers on the runway, the process 300 may terminate at block 314.

Figure 4:
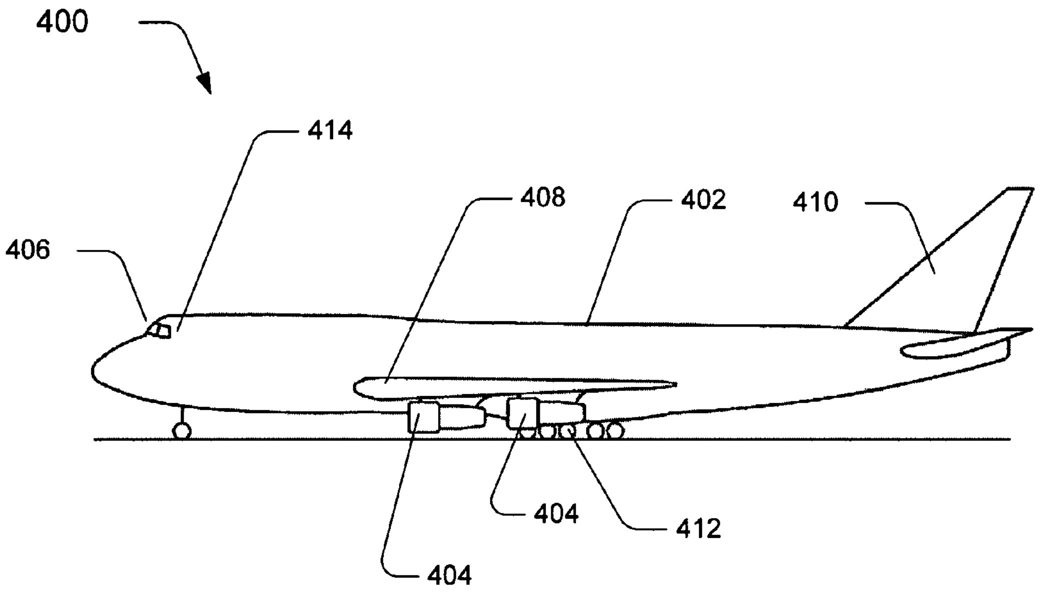
FIG. 4 is a side elevational view of an aircraft equipped with the capture maneuver computer as illustrated in FIG. 2, in accordance with another embodiment of the invention.

FIG. 4 is a side elevational view of an aircraft 400 in accordance with an embodiment of the present invention. In general, except for one or more systems in accordance with the present invention, the various components and subsystems of the aircraft 400 may be of known construction and, for the sake of brevity, will not be described in detail herein. As shown in FIG. 4, the aircraft 400 includes one or more propulsion units 404 coupled to a fuselage 402, a cockpit 406 in the fuselage 402, wing assemblies 408 (or other lifting surfaces), a tail assembly 410, a landing assembly 412, a control system (not visible), and a host of other systems and subsystems that enable proper operation of the aircraft 400. At least one component of a capture maneuver system 414 formed in accordance with the present invention is located within the fuselage 402. However, components of the capture maneuver system 414 may be distributed throughout the various portions of the aircraft 400.

Although the aircraft 400 shown in FIG. 4 is generally representative of a commercial passenger aircraft, including, for example, the 737, 747, 757, 767, 777, and 787 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of system and methods in accordance with the present invention may be utilized in other aerial vehicles, both manned and unmanned.

Embodiments of systems and methods in accordance with the present disclosure may provide significant advantages over the prior art. For example, with the ability to perform localizer capture maneuvers from larger intercept angles and within closer proximity to the runway threshold, airlines may save fuel costs and time by reducing the length of the downwind leg. Currently, aircrafts generally fly downwind legs of sufficient length such that they can turn to their intercept heading yet have enough distance to the airfield to execute a shallow angle localizer capture. Moreover, the reduction of overshoots by aircrafts may provide fuel cost and time savings, as the overshoots for some current localizer captures can be one mile or longer.

Additionally, embodiments and methods in accordance with the current disclosure may potentially help to ease air traffic congestion at airports that are equipped with parallel runways. This is due to the fact that reduction in localizer overshoots may allow air traffic controllers to more closely sequence aircraft that are concurrently using two parallel runways. The ability to execute captures at larger intercept angles also may provide air traffic controllers additional freedom to sequence aircraft to converge on their final approach from a larger array of courses. This may reduce or eliminate the long lines of aircraft waiting to begin their capture maneuvers from a common location.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A method for guiding an aircraft, comprising:

determining at least one instrument landing system (ILS) threshold;

establishing at least one final approach course (FAC) deviation threshold for the aircraft;

receiving at least one ILS localizer error;

calculating at least one FAC deviation;

comparing the at least one ILS localizer error and the at least one FAC deviation with corresponding ILS and FAC thresholds, respectively; and performing a standard localizer capture maneuver if the at least one ILS localizer error reaches a corresponding ILS threshold prior to the at least one FAC deviation reaching a corresponding FAC threshold, and performing a modified capture maneuver if the at least one FAC deviation reaches the corresponding FAC threshold prior to the at least one ILS localizer error reaching the corresponding ILS threshold.

2. The method of claim 1, wherein the aircraft is configured to intercept an ILS localizer null, and wherein performing a modified capture maneuver includes performing a modified maneuver that is configured to turn the aircraft to an initial intercept angle between 30 degrees to 40 degrees, inclusive, with the ILS localizer null.

3. The method of claim 1, wherein performing the standard localizer capture maneuver includes performing the standard localizer capture maneuver upon nearing an ILS course guidance sector, and wherein performing the modified capture maneuver includes performing the modified capture maneuver prior to reaching the course guidance sector.

4. The method of claim 1, wherein the modified capture maneuver includes a turn maneuver to a shallow intercept angle and at least a portion of the standard localizer capture maneuver.

5. The method of claim 4, further comprising:

if the performed capture maneuver is a modified capture maneuver, comparing the at least one ILS localizer error with at least one corresponding ILS threshold during the modified capture maneuver, and switching from the shallow intercept angle turn to the at least a portion of the standard localizer ILS capture maneuver if the at least one ILS localizer error reaches the corresponding threshold.

6. The method of claim 4, further comprising providing at least one of an audio alert and a visual alert to indicate the performance of the turn maneuver to the shallow intercept angle.

7. A computer readable medium having computer-executable instructions that, when executed, perform a method comprising:

determining at least one instrument landing system (ILS) threshold of an aircraft;

establishing at least one final approach course (FAC) deviation threshold for the aircraft;

receiving at least one instrument landing system (ILS) input for the aircraft;

receiving at least one FAC deviation input for the aircraft;

comparing the at least one ILS localizer error and the at least one FAC deviation with corresponding ILS and FAC thresholds; and performing a standard localizer ILS capture maneuver if the at least one ILS localizer error reaches a corresponding ILS threshold; and performing a turn maneuver to a shallow intercept angle prior to performing the standard localizer capture maneuver at least if the at least one FAC deviation reaches a corresponding FAC threshold.

8. The computer readable medium of claim 7, wherein performing the standard localizer capture maneuver includes performing the standard localizer capture maneuver upon nearing a course guidance sector.

9. The computer readable medium of claim 8, wherein the aircraft is configured to intercept an ILS localizer null, and wherein performing the turn maneuver to the shallow intercept angle turn includes performing a shallow angle turn configured to turn the aircraft to an initial intercept angle between 30 degrees to 40 degrees, inclusive, with the ILS localizer null.

10. The computer readable medium of claim 7, wherein the method further comprises, prior to performing the standard localizer ILS capture maneuver, determining the accuracy of the FAC deviation input based on an estimate of actual navigation performance (ANP), and wherein performing the turn maneuver to the shallow intercept angle includes performing the turn maneuver if the at least one FAC deviation reaches the corresponding FAC threshold and the FAC deviation input is accurate.

11. The computer readable medium of claim 7, wherein the method further comprises determining an intercept angle of the aircraft to a ILS localizer null, and wherein performing the turn maneuver to the shallow intercept angle includes performing the turn maneuver if the at least one FAC deviation reaches the corresponding FAC threshold and the intercept angle is between 40 degrees to 120 degrees, inclusive, prior to performing the standard localizer capture maneuver.

12. The computer readable medium of claim 7, wherein the method further comprises providing an audio alert to indicate the performance of the turn maneuver to the shallow intercept angle.

13. The computer readable medium of claim 7, wherein performing the turn maneuver to the shallow intercept angle turn includes performing the turn maneuver prior to reaching the course guidance sector.

14. The computer readable medium of claim 7, wherein performing the turn maneuver to the shallow intercept angle includes performing the turn maneuver via one of an autopilot and a flight director.

15. An aircraft comprising:

a structural assembly; and at least one system for guiding aircraft at least partially disposed within the structural assembly, the system comprising:

an instrument landing system (ILS) component configured to receive at least one ILS localizer error and at least one calculated ILS threshold;

a flight management function (FMF) component configured to receive at least one calculated final approach course (FAC) deviation and at least one established FAC deviation threshold;

a comparator component configured to compare the at least one ILS localizer error and the at least one FAC deviation with corresponding ILS and FAC thresholds;

an execution component configured to perform a standard localizer capture maneuver if the at least one ILS localizer error reaches a corresponding ILS threshold prior to the at least one FAC deviation reaching a corresponding FAC threshold, and perform a modified capture maneuver if the at least one FAC deviation reaches the corresponding FAC threshold prior to the at least one ILS localizer error reaching the corresponding ILS threshold.

16. The aircraft of claim 15, wherein the modified capture maneuver includes a shallow intercept angle turn maneuver and at least a portion of the standard localizer capture maneuver.

17. The aircraft of claim 16, wherein during the performance of the modified capture maneuver, the execution component is further configured to compare the at least one ILS localizer error with at least one corresponding ILS threshold, and switch from the shallow intercept angle turn to the at least a portion of the standard localizer capture maneuver if the at least one ILS localizer error reaches the corresponding ILS threshold.

18. The aircraft of claim 15, wherein the aircraft is configured to intercept an ILS localizer null, and wherein the execution component is further configured to perform the modified capture maneuver that includes a shallow intercept angle turn that maneuvers the aircraft to an initial intercept angle between 30 degrees to 40 degrees, inclusive, with the ILS localizer null.

19. The method of claim 1, wherein performing the modified capture maneuver includes performing the modified capture maneuver via an autopilot or a flight director.

20. The computer readable medium of claim 7, wherein performing the turn maneuver to the shallow intercept angle includes performing the turn maneuver prior to performing the standard localizer capture maneuver if the at least one FAC deviation reaches the corresponding FAC threshold prior the at least one ILS localizer error reaching the corresponding ILS threshold.

* * * * *